United States Patent
Yamakawa et al.

(10) Patent No.: US 10,294,158 B2
(45) Date of Patent: May 21, 2019

(54) HYDRAULIC COMPOSITION

(71) Applicant: Shin-Etsu Chemical Co., Ltd., Tokyo (JP)

(72) Inventors: Tsutomu Yamakawa, Joetsu (JP); Hidekazu Konishi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/861,317

(22) Filed: Jan. 3, 2018

(65) Prior Publication Data

US 2018/0208507 A1 Jul. 26, 2018

(30) Foreign Application Priority Data

Jan. 20, 2017 (JP) ................................ 2017-008488
Sep. 21, 2017 (JP) ................................ 2017-181052

(51) Int. Cl.
| | | |
|---|---|---|
| C04B 24/08 | (2006.01) | |
| C04B 24/12 | (2006.01) | |
| C04B 24/38 | (2006.01) | |
| C04B 28/02 | (2006.01) | |
| C04B 24/32 | (2006.01) | |
| C08B 11/193 | (2006.01) | |
| C04B 103/30 | (2006.01) | |
| C04B 103/00 | (2006.01) | |
| C04B 103/40 | (2006.01) | |
| C04B 103/50 | (2006.01) | |
| C04B 103/60 | (2006.01) | |

(52) U.S. Cl.
CPC ............ *C04B 24/383* (2013.01); *C04B 24/08* (2013.01); *C04B 24/121* (2013.01); *C04B 24/32* (2013.01); *C04B 28/02* (2013.01); *C08B 11/193* (2013.01); *C04B 2103/0083* (2013.01); *C04B 2103/304* (2013.01); *C04B 2103/406* (2013.01); *C04B 2103/50* (2013.01); *C04B 2103/601* (2013.01)

(58) Field of Classification Search
CPC ..... C04B 24/383; C04B 24/08; C04B 24/121; C04B 24/32; C04B 28/02; C04B 2103/304; C04B 2103/0083; C04B 2103/406; C04B 2103/50; C04B 2103/601; C08B 11/193
See application file for complete search history.

(56) References Cited

FOREIGN PATENT DOCUMENTS

| EP | 2 939 990 A2 | 11/2015 |
|---|---|---|
| GB | 2 292 141 A | 2/1996 |
| JP | 6-206752 A | 7/1994 |
| JP | 8-59320 A | 3/1996 |
| JP | 8-59327 A | 3/1996 |

OTHER PUBLICATIONS

Extended European Search Report dated Jun. 12, 2018, issued in European Patent Application No. 17210809.4.

*Primary Examiner* — Anthony J Green
(74) *Attorney, Agent, or Firm* — Birch, Stewart, Kolasch & Birch, LLP

(57) ABSTRACT

A hydraulic composition comprising an AE agent, water-soluble cellulose ether, defoamer, cement, water, and aggregate is provided. The AE agent contains a fatty acid-based surfactant consisting of a fatty acid, alkali metal salt, lower alkylamine salt or lower alkanolamine salt thereof and a nonionic surfactant consisting of a polyoxyethylene phenyl ether. The hydraulic composition has frost damage resistance and experiences little bleeding.

6 Claims, No Drawings

HYDRAULIC COMPOSITION

CROSS-REFERENCE TO RELATED APPLICATION

This non-provisional application claims priority under 35 U.S.C. § 119(a) on Patent Application Nos. 2017-008488 and 2017-181052 filed in Japan on Jan. 20, 2017 and Sep. 21, 2017, respectively, the entire contents of which are hereby incorporated by reference.

TECHNICAL FIELD

This invention relates to a hydraulic composition and more particularly, to a hydraulic composition having frost damage resistance and experiencing little bleeding.

BACKGROUND ART

In hydraulic compositions such as concrete compositions, water-soluble cellulose ethers are used for imparting material segregation resistance, bleeding reduction effect, and fluidity thereto. The hydraulic composition to which a water-soluble cellulose ether is added, however, may have an excessive air content because the water-soluble cellulose ether has a surface-active effect to entrain more air bubbles during mixing of the hydraulic composition. The air bubbles entrained with the aid of the water-soluble cellulose ether have a large diameter outside the effective range for frost damage resistance. It is thus a common practice to use a defoamer to remove coarse air bubbles.

For imparting frost damage resistance to the hydraulic composition, fine air bubbles having a diameter of about 25 to about 250 μm must be entrained into the hydraulic composition. To this end, air entraining (AE) agents are typically used. In the case of a hydraulic composition having a water-soluble cellulose ether added thereto, a defoamer must be used as mentioned above for the purpose of eliminating air bubbles entrained due to the water-soluble cellulose ether, thereby achieving the desired air content. This composition is difficult to satisfy frost damage resistance because the defoamer eliminates not only air bubbles entrained by the water-soluble cellulose ether, but also fine air bubbles entrained by the AE agent.

To solve the problem, for example, Patent Document 1 proposes to use O-2,3-dihydroxypropyl cellulose (DHPC) having a low air entraining ability, as the water-soluble cellulose ether. Patent Document 2 proposes to use hollow microbeads instead of the AE agent. Patent Document 3 discloses an AE agent which is effective for use in a cement composition containing fly ash.

CITATION LIST

Patent Document 1: JP-A H06-206752
Patent Document 2: JP-A H08-059327
Patent Document 3: JP-A H08-059320

SUMMARY OF INVENTION

The cement composition of Patent Document 1 using DHPC is satisfactory in frost damage resistance, but short in thickening effect. Thus DHPC may be inferior in material segregation resistance, bleeding reduction effect, and fluidity imparting effect to conventional cellulose ethers. The composition of Patent Document 2 may be difficult to control the air content because the air content widely varies between batches. Also, hollow microbeads are expensive and add to the cost. The composition of Patent Document 3 is insufficient in bleeding reduction and air content retention.

An object of the invention is to provide a hydraulic composition containing an AE agent and a water-soluble cellulose ether and having frost damage resistance and restrained bleeding.

The inventors have found that a hydraulic composition having frost damage resistance and restrained bleeding is obtained using a specific AE agent and a water-soluble cellulose ether.

In one aspect, the invention provides a hydraulic composition comprising at least an AE agent, a water-soluble cellulose ether, a defoamer, cement, water, and an aggregate, the AE agent comprising a fatty acid-based surfactant consisting of a fatty acid, an alkali metal salt, lower alkylamine salt or lower alkanolamine salt thereof and a nonionic surfactant consisting of a polyoxyethylene phenyl ether. The fatty acid has the general formula (1):

wherein $R^1$ is a $C_{12}$-$C_{24}$ alkyl or alkenyl group. The polyoxyethylene phenyl ether has the general formula (2):

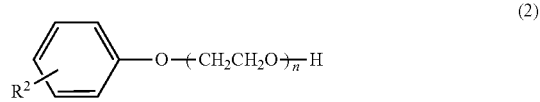

wherein $R^2$ is a $C_8$ or $C_9$ alkyl group and n is an integer of 1 to 50.

In a preferred embodiment, the water-soluble cellulose ether is hydroxypropyl methyl cellulose or hydroxyethyl methyl cellulose.

In a preferred embodiment, the hydroxypropyl methyl cellulose has a ratio (A/B) of a molar fraction of methoxy-substituted hydroxypropyl (A) to a molar fraction of methoxy-free hydroxypropyl (B) in the range from 0.2/1 to 1.0/1.

In a preferred embodiment, the hydroxyethyl methyl cellulose has a ratio (A/B) of a molar fraction of methoxy-substituted hydroxyethyl (A) to a molar fraction of methoxy-free hydroxyethyl (B) in the range from 2.0/1 to 3.0/1.

In a preferred embodiment, the AE agent is present in an amount of 0.0001 to 0.5% by weight based on the cement.

In a preferred embodiment, the hydraulic composition has an air void spacing factor of 25 to 250 μm.

ADVANTAGEOUS EFFECTS OF INVENTION

The hydraulic composition of the invention has the advantages of frost damage resistance and restrained bleeding.

DESCRIPTION OF PREFERRED EMBODIMENTS

As used in the art, DS refers to "degree of substitution" and MS to "molar substitution". The notation (Cn-Cm) means a group containing from n to m carbon atoms per group.

The hydraulic composition comprises at least an AE agent, a water-soluble cellulose ether, a defoamer, cement, water, and an aggregate. The AE agent contains a fatty acid-based surfactant consisting of a fatty acid having the general formula (1), an alkali metal salt of a fatty acid having the general formula (1), a lower alkylamine salt of a fatty acid having the general formula (1) or a lower alkanolamine salt of a fatty acid having the general formula (1), and a nonionic surfactant consisting of a polyoxyethylene phenyl ether having the general formula (2).

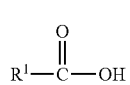
(1)

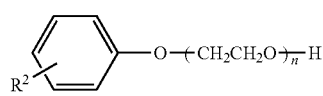
(2)

In formula (1), $R^1$ is a $C_{12}$-$C_{24}$ alkyl or alkenyl group, which may be linear or branched.

Examples of the fatty acid having formula (1) include myristic acid ($C_{14}$, $R^1=C_{13}$), pentadecylic acid ($C_{15}$, $R^1=C_{14}$), palmitic acid ($C_{16}$, $R^1=C_{15}$), margaric acid ($C_{17}$, $R^1=C_{16}$), stearic acid ($C_{18}$, $R^1=C_{17}$), oleic acid ($C_{18}$, $R^1=C_{17}$, 1 double bond), linoleic acid ($C_{18}$, $R^1=C_{17}$, 2 double bonds), and linolenic acid ($C_{18}$, $R^1=C_{17}$, 3 double bonds).

Examples of the alkali metal salt of the fatty acid having formula (1) include sodium and potassium salts. Examples of the lower alkylamine salt of the fatty acid include triethylamine and diisopropylethylamine salts. Examples of the lower alkanolamine salt of the fatty acid include monoethanolamine and triethanolamine salts.

Suitable fatty acid-based surfactants include tall oil fatty acid soaps (tall oil is a mixture of oleic acid, linoleic acid, palmitic acid, and stearic acid), oleic acid soaps, and linoleic acid soaps, with the tall oil fatty acid soaps being preferred. The preferred soaps are sodium soaps.

The nonionic surfactant is a polyoxyethylene phenyl ether having formula (2) wherein $R^2$ is a $C_8$ or $C_9$ alkyl group, which may be linear or branched. The linear $C_8$ and $C_9$ alkyl groups are n-octyl and n-nonyl. The branched $C_8$ and $C_9$ alkyl groups are isooctyl and isononyl. Suitable nonionic surfactants include polyoxyethylene phenyl ethers such as polyoxyethylene nonylphenyl ether and polyoxyethylene octylphenyl ether. The number (n) of moles of ethylene oxide added is typically in a range from 1 to 50, within which air entrainment is improved and the amount of AE agent used is reduced. The molar number (n) is preferably in a range from 20 to 30 in consideration of the tendency that water solubility lowers.

The AE agent used herein should contain at least the fatty acid-based surfactant and the nonionic surfactant defined above. If either one of the fatty acid-based surfactant and the nonionic surfactant is used, the hydraulic composition has an air void spacing factor in excess of 250 μm, failing to develop sufficient frost damage resistance. In the AE agent, the fatty acid-based surfactant and the nonionic surfactant are preferably used in a weight ratio of (1-99):(99-1), more preferably (20-80):(80-20), even more preferably (40-60):(60-40).

Although the amount of the AE agent used varies with the desired air content and the type of components in the hydraulic composition, it is preferably 0.0001 to 0.5% by weight, more preferably 0.001 to 0.3% by weight based on the cement.

Suitable water-soluble cellulose ethers include hydroxypropyl methyl cellulose and hydroxyethyl methyl cellulose. The water-soluble cellulose ether is preferably nonionic and may be used alone or in admixture of two or more depending on a particular purpose. The hydroxypropyl methyl cellulose (HPMC) preferably has a DS of methoxy of 1.0 to 2.2, more preferably 1.3 to 1.9 and a MS of hydroxypropoxy of 0.1 to 0.6, more preferably 0.1 to 0.5. The hydroxyethyl methyl cellulose preferably has a DS of methoxy of 1.0 to 2.2, more preferably 1.3 to 1.9 and a MS of hydroxyethoxy of 0.1 to 0.6, more preferably 0.2 to 0.4. Notably the DS of alkyl and the MS of hydroxyalkyl of the water-soluble cellulose ether may be determined from conversion of the value measured according to the analysis of DS of hypromellose (hydroxypropyl methyl cellulose) prescribed in the Japanese Pharmacopoeia, 17th Edition.

For the hydroxypropyl methyl cellulose, it is preferred from the aspect of air content retention that a ratio (A/B) of a molar fraction of methoxy-substituted hydroxypropyl (A) to a molar fraction of methoxy-free hydroxypropyl (B) is in the range from 0.2/1 to 1.0/1, more preferably from 0.3/1 to 0.8/1, and even more preferably from 0.3/1 to 0.7/1. For the hydroxyethyl methyl cellulose, it is preferred from the aspect of air content retention that a ratio (A/B) of a molar fraction of methoxy-substituted hydroxyethyl (A) to a molar fraction of methoxy-free hydroxyethyl (B) is in the range from 2.0/1 to 3.0/1, more preferably from 2.2/1 to 2.8/1.

The molar fraction of methoxy-substituted hydroxyalkyl (A) wherein the hydroxyl group of hydroxyalkyl (i.e., hydroxypropyl or hydroxyethyl) is substituted by a methoxy group and the molar fraction of methoxy-free hydroxyalkyl (B) wherein the hydroxyl group is not substituted with a methoxy group are analyzed as described in Macromolecules, 20, 2413 (1987) and Sen'i Gakkaishi (Journal of Japanese Textile Society), 40, T-504 (1984), by subjecting a water-soluble hydroxyalkyl alkyl cellulose to hydrolysis in sulfuric acid, neutralization, chemical reduction with sodium borohydride, purification by filtration, and acetylation. The resulting sample is analyzed by mass spectrometry together with one of $^{13}$C-NMR, liquid chromatography and gas chromatography, while heating from 150° C. to 280° C. at a rate of 2.5° C./min and holding at 280° C. for 10 minutes. The molar fractions are determined from the graphical parameters of respective groups thus identified.

The molar fractions (A) and (B) are computed from a hydroxyalkyl group with which only one of hydroxyl groups at 2, 3, and 6-positions on each glucose ring is monomolecularly substituted, excluding a hydroxyalkyl group with which the hydroxyl group of the above hydroxyalkyl group is further substituted.

From the standpoint of bleeding reduction, a 2 wt % aqueous solution of the water-soluble cellulose ether preferably has a viscosity at 20° C. of 10 to 200,000 mPa·s, more preferably 50 to 100,000 mPa·s, and even more preferably 100 to 50,000 mPa·s as measured by a BH type viscometer at 20 rpm.

From the standpoints of bleeding reduction and fluidity, the water-soluble cellulose ether is preferably added in an amount of 0.01 to 5 kg, more preferably 0.05 to 3 kg, and even more preferably 0.1 to 2 kg per cubic meters (m$^3$) of the hydraulic composition.

Suitable defoamers include oxyalkylene, silicone, alcohol, mineral oil, fatty acid, and fatty acid ester-based defoamers.

Examples of the oxyalkylene-based defoamer include polyoxyalkylenes such as (poly)oxyethylene (poly)oxypropylene adducts; (poly)oxyalkylene alkyl ethers such as diethylene glycol heptyl ether, polyoxyethylene oleyl ether, polyoxypropylene butyl ether, polyoxyethylene polyoxypropylene 2-ethylhexyl ether, and oxyethylene oxypropylene adducts to higher alcohols of at least 8 carbon atoms or secondary alcohols of 12 to 14 carbon atoms; (poly)oxyalkylene (alkyl) aryl ethers such as polyoxypropylene phenyl ether and polyoxyethylene nonylphenyl ether; acetylene ethers obtained from addition polymerization of alkylene oxides to acetylene alcohols, for example, 2,4,7,9-tetramethyl-5-decyne-4,7-diol, 2,5-dimethyl-3-hexyne-2,5-diol, and 3-methyl-1-butyn-3-ol; (poly)oxyalkylene fatty acid esters such as diethylene glycol oleate, diethylene glycol laurate, ethylene glycol distearate, and polyoxyalkylene oleates; (poly)oxyalkylene sorbitan fatty acid esters such as polyoxyethylene sorbitan monolaurate and polyoxyethylene sorbitan trioleate; (poly)oxyalkylene alkyl (aryl) ether sulfuric acid ester salts such as polyoxypropylene methyl ether sodium sulfate and polyoxyethylene dodecylphenol ether sodium sulfate; (poly)oxyalkylene alkyl phosphoric acid esters such as (poly)oxyethylene stearyl phosphate; (poly)oxyalkylene alkyl amines such as polyoxyethylene lauryl amine; and polyoxyalkylene amides.

Examples of the silicone-based defoamer include dimethylsilicone oil, silicone paste, silicone emulsions, organic modified polysiloxanes (e.g., polyorganosiloxanes such as dimethylpolysiloxane), and fluorosilicone oil.

Examples of the alcohol-based defoamer include octyl alcohol, 2-ethylhexyl alcohol, hexadecyl alcohol, acetylene alcohol, and glycol.

Examples of the mineral oil-based defoamer include kerosine and liquid paraffin.

Examples of the fatty acid-based defoamer include oleic acid, stearic acid, and alkylene oxide adducts thereof.

Examples of the fatty acid ester-based defoamer include glycerol monoricinolate, alkenyl succinate derivatives, sorbitol monolaurate, sorbitol trioleate, and natural wax.

Of these, oxyalkylene-based defoamers are preferred for their defoaming performance.

From the aspect of air content control, the amount of the defoamer added is preferably 0.01 to 30% by weight, more preferably 0.1 to 20% by weight, and even more preferably 1 to 10% by weight based on the water-soluble cellulose ether.

Examples of the cement include various types of cement such as ordinary Portland cement, high-early-strength Portland cement, moderate-heat Portland cement, blast-furnace slag cement, silica cement, fly-ash cement, alumina cement, and ultra-high-early-strength Portland cement.

The cement is contained in an amount capable of achieving sufficient strength. When the hydraulic composition is concrete, the content of cement is preferably 270 to 800 kg per m$^3$ of the concrete. When the hydraulic composition is mortar, the content of cement is preferably 300 to 1,000 kg per m$^3$ of the mortar. Examples of the concrete include ordinary concrete, high-fluidity concrete, and medium-fluidity concrete. Examples of the mortar include tile attaching mortar, repairing mortar, and self-leveling agents.

Tap water and seawater may be used as the water, with tap water being preferred in consideration of salt attack.

It is preferred in view of segregation that the hydraulic composition have a water/cement ratio (% by weight) of from 30 to 75% by weight, more preferably from 45 to 65% by weight.

Suitable aggregates include coarse aggregates and fine aggregates. Examples of the fine aggregate include river sand, pit sand, land sand, and crushed sand. The particle size (maximum size) of the fine aggregate is preferably up to 5 mm. Examples of the coarse aggregate include river gravel, pit gravel, land gravel, and crushed stone. The particle size (maximum size) of the coarse aggregate is larger than that of the fine aggregate, and preferably up to 40 mm, more preferably up to 25 mm.

When the hydraulic composition is concrete, the content of the fine aggregate is preferably 400 to 1,100 kg, more preferably 500 to 1,000 kg per m$^3$ of the concrete. When the hydraulic composition is mortar, the content of the fine aggregate is preferably 500 to 2,000 kg, more preferably 600 to 1,600 kg per m$^3$ of the mortar.

When the hydraulic composition is concrete, the content of the coarse aggregate is preferably 600 to 1,200 kg, more preferably 650 to 1,150 kg per m$^3$ of the concrete.

When the hydraulic composition is concrete, the proportion of fine aggregate, as defined below, is preferably 30 to 55% by volume, more preferably 35 to 55% by volume, even more preferably 35 to 50% by volume based on the total volume of the aggregates for retention of fluidity or sufficient strength.

Fine aggregate proportion (vol %)=(volume of fine aggregate)/(volume of fine aggregate+volume of coarse aggregate)×100

Further, a water-reducing agent may be added to the hydraulic composition, if necessary, for retaining high fluidity with a smaller amount of water. The water-reducing agents used herein include lignin, polycarboxylic acid, and melamine based agents.

Exemplary of the lignin are lignin sulfonic acid salts and derivatives thereof. Exemplary of the polycarboxylic acid are polycarboxylic acid ethers, composites of polycarboxylic acid ethers with crosslinked polymers, composites of polycarboxylic acid ethers with oriented polymers, composites of polycarboxylic acid ethers with highly modified polymers, polyether carboxylic acid-based polymers, maleic acid copolymers, maleate copolymers, maleic acid derivative copolymers, carboxyl-containing polyethers, sulfone-terminated polycarboxylate-containing multiple polymers, polycarboxylic acid-based graft copolymers, polycarboxylic acid-based compounds, and polycarboxylic acid ether-based polymers. Exemplary of the melamine are melamine-sulfonic acid-formaldehyde condensates, melamine-sulfonate condensates, and melamine-sulfonate-polyol condensates.

The amount of the water-reducing agent is preferably 0.01 to 5% by weight, more preferably 0.1 to 3% by weight based on the cement when the fluidity of the hydraulic composition is taken into account.

If necessary, another air-entraining (AE) agent may be added to the hydraulic composition for providing the desired air content and rendering the hydraulic composition durable. Other AE agents include anionic surfactants, cationic surfactants, nonionic surfactants, ampholytic surfactants, and rosin-based surfactants. Examples of the anionic surfactant include carboxylic acid, sulfate, sulfonic acid, and phosphate type surfactants. Examples of the cationic surfactant include amine salt, primary amine salt, secondary amine salt, tertiary amine salt, and quaternary amine salt type surfactants. Examples of the nonionic surfactant include ester, ester-ether, ether, and alkanolamide type surfactants. Examples of the ampholytic surfactant include amino acid and sulfobetaine type surfactants. Examples of the rosin-based surfactant include abietic acid, neoabietic acid, palustric acid, pimaric acid, isopimaric acid, and dehydroabetic acid.

If necessary, setting accelerators such as calcium chloride, lithium chloride, and calcium formate and setting retarders such as sodium citrate and sodium gluconate may be added to the hydraulic composition for the purposes of managing the physical properties of a fresh hydraulic composition (fresh concrete or mortar) immediately after mixing.

Further, hauyne and lime-based expansive additives may optionally be added to the hydraulic composition for the purposes of preventing cracking by shrinkage upon setting and drying, and preventing cracking by thermal stresses associated with the heat of hydration of cement.

The hydraulic composition of the invention may be prepared in a standard manner. For example, a forced double-shaft mixer is charged with the water-soluble cellulose ether, deformer, cement, and aggregate (fine and coarse aggregates), which are dry mixed. Then water, the water-reducing agent and AE agent are added to the mixer and mixed, yielding a hydraulic composition. Notably, the amount of AE agent is determined in consideration of the amount of defoamer such that the composition may have an air content of 4.5±1.5%.

From the aspect of frost damage resistance, the hydraulic composition preferably has an air void spacing factor of 25 to 250 μm, more preferably 25 to 230 urn. The air void spacing factor may be measured, for example, by an air void analyzer (AVA®, Germann Instruments, Inc.).

EXAMPLE

Examples of the invention are given below by way of illustration and not by way of limitation.
Ingredients
(1) AE agent: Shown in Table 1
(2) Water-soluble cellulose ether: Shown in Table 2
(3) Defoamer 1: SN Defoamer 14HP (oxyalkylene-based defoamer by San Nopco Ltd.)
Defoamer 2: AGITAN 299 (oxyalkylene-based defoamer by Munzing Chemie GmbH)
(4) Cement (C): Ordinary Portland cement (Taiheiyo Cement Corp.), density: 3.16 g/cm³
(5) Water (W): Tap water
(6) Fine aggregate (S): Sand having a maximum particle size of 5 mm
from Shimonigorigawa, Myoko-shi, Niigata, Japan, water absorption: 2.79%,
saturated surface-dry density: 2.57 g/cm³
(7) Coarse aggregate (G): Gravel having a maximum particle size of 25 mm
from Shimonigorigawa, Myoko-shi, Niigata, Japan, water absorption: 1.45%,
saturated surface-dry density: 2.60 g/cm³
(8) Water-reducing agent 1: MasterPozzolith No. 70 (BASF Japan, Ltd.),
lignin sulfonic acid-polyol composite
Water-reducing agent 2: MasterRheobuild 4000 (BASF, Japan, Ltd.),
melamine sulfonic acid-based compound

TABLE 1

| Sample | Fatty acid-based surfactant | Proportion (wt %) | Nonionic surfactant | EO | Proportion (wt %) |
|---|---|---|---|---|---|
| AE-1 | sodium soap of tall oil fatty acid | 25 | polyoxyethylene nonylphenyl ether | 20 | 75 |
| AE-2 | sodium soap of tall oil fatty acid | 50 | polyoxyethylene nonylphenyl ether | 20 | 50 |
| AE-3 | sodium soap of tall oil fatty acid | 75 | polyoxyethylene nonylphenyl ether | 20 | 25 |
| AE-4 | sodium soap of linoleic acid | 50 | polyoxyethylene octylphenyl ether | 10 | 50 |
| AE-5 | sodium soap of linoleic acid | 50 | polyoxyethylene octylphenyl ether | 20 | 50 |
| AE-6 | sodium soap of linoleic acid | 50 | polyoxyethylene octylphenyl ether | 30 | 50 |
| AE-7 | sodium soap of linoleic acid | 50 | polyoxyethylene octylphenyl ether | 40 | 50 |
| AE-8 | monoethanolamine salt of linoleic acid | 50 | polyoxyethylene octylphenyl ether | 30 | 50 |
| AE-9 | diisopropylethylamine salt of linolenic acid | 50 | polyoxyethylene octylphenyl ether | 30 | 50 |
| AE-10 | sodium soap of tall oil fatty acid | 100 | — | — | 0 |
| AE-11 | — | 0 | polyoxyethylene nonylphenyl ether | 30 | 100 |

TABLE 2

| Sample | Type | DS | MS | Methoxy-substituted hydroxyalkyl (A) | Methoxy-free hydroxyalkyl (B) | A/B | Viscosity of 2 wt % solution (mPa · s) |
|---|---|---|---|---|---|---|---|
| CE-1 | HPMC | 1.4 | 0.20 | 0.25 | 0.75 | 0.33 | 4,500 |
| CE-2 | HPMC | 1.5 | 0.16 | 0.39 | 0.61 | 0.64 | 420 |
| CE-3 | HEMC | 1.5 | 0.33 | 0.71 | 0.29 | 2.45 | 10,300 |
| CE-4 | HPMC | 1.5 | 0.40 | 0.29 | 0.71 | 0.41 | 29,800 |
| CE-5 | HPMC | 1.6 | 0.44 | 0.35 | 0.65 | 0.54 | 4,350 |
| CE-6 | HEMC | 1.4 | 0.22 | 0.69 | 0.31 | 2.22 | 5,200 |

Examples 1 to 15 and Comparative Examples 1 to 5

Mixing of Concrete

A 60-L forced double-shaft mixer was charged with the water-soluble cellulose ether shown in Table 2, defoamer, cement, fine aggregate, and coarse aggregate, which were dry mixed for 30 seconds. Then water, the water-reducing agent and AE agent shown in Table 1 were added to the mixer and mixed for 90 seconds, yielding two concrete mixtures shown in Table 3. The volume of the concrete mixed was 40 L per batch.

The water-soluble cellulose ether was added in an amount shown in Table 4, the defoamer was used in an amount of 5 wt % based on the water-soluble cellulose ether, and the AE agent was used in such an amount that the concrete had an air content of 4.5±1.5%. The amount of the water-reducing agent was 0.25 wt % based on the cement when it was MasterPozzolith No. 70, and 2.00 wt % based on the cement when it was MasterRheobuild 4000.

TABLE 3

| | Coarse aggregate maximum size [Gmax] (mm) | Water/cement ratio [W/C] (%) | Proportion of fine aggregate* [s/a] (%) | Unit content (kg/m³) | | | |
|---|---|---|---|---|---|---|---|
| | | | | Water [W] | Cement [C] | Fine aggregate [S] | Coarse aggregate [G] |
| Mix 1 | 25 | 50.0 | 45.0 | 175 | 350 | 774 | 957 |
| Mix 2 | 25 | 46.3 | 50.0 | 185 | 400 | 827 | 836 |

*Proportion of fine aggregate (vol %) = (volume of fine aggregate)/(volume of fine aggregate + volume of coarse aggregate) × 100
Mix 1: Ordinary concrete mixture
Mix 2: High-fluidity concrete mixture The concrete compositions of Examples 1 to 15 and Comparative Examples 1 to 5 were evaluated by the following methods, with the results shown in Tables 4 to 6. Notably an air content (A30) after 30 minutes of standing and an air content retention (A30/A0) were evaluated only on the compositions of Examples 10 to 15 and Comparative Examples 4 and 5.

Evaluation Methods

1. Concrete Temperature

The temperatures of ingredients were adjusted such that the concrete reached a temperature of 20±3° C. at the end of mixing.

2. Air Content

An air content (A0) immediately after mixing and an air content (A30) after 30 minutes of standing are defined as follows, and a ratio (A30/A0) is calculated and reported as air content retention.

air content (A0) immediately after mixing

The concrete immediately after mixing was tested according to JIS A 1128.

air content (A30) after 30 minutes of standing

The concrete was left to stand for 30 minutes after mixing, remixed, and tested according to JIS A 1128.

3. Slump Test

The test was performed according to JIS A 1101.

Mix 1 was evaluated for fluidity by the slump test.

4. Slump Flow Test

The test was performed according to JIS A 1150.

Mix 2 was evaluated for fluidity by the slump flow test.

5. Frost (Freeze/Thaw) Damage Test

The test was performed according to method A in JIS A 1148-2010. The relative dynamic modulus of elasticity was measured until 300 cycles at maximum. The concrete was judged frost damage resistant when the relative dynamic modulus of elasticity after 300 cycles was 60% or higher.

6. Air Void Spacing Factor

The air void spacing factor, which is an index of frost (freeze/thaw) damage resistance, was measured by an air void analyzer (AVA®, Germann Instruments, Inc.). The AVA measurement solution was prepared in advance by combining glycerol (Wako Pure Chemical Industries, Ltd.) and water in a weight ratio (glycerol/water) of 83/17.

The mixed concrete was passed through a sieve of opening 5 mm, yielding mortar for air void spacing factor measurement. From the mortar, a 20 ml specimen was collected in a special syringe. About 2,000 ml of water was injected into the measurement column. Bubbles stuck to the column wall were removed with a brush. The above AVA measurement solution, 250 ml, was injected to the column bottom through a special tool. After injection, an air void collecting petri dish was placed near the water surface in the column and attached to a measuring unit. The 20 ml mortar specimen was injected from the syringe to the column bottom. The mortar was then stirred for 30 seconds, allowing the air entrained in the mortar to fully release into the solution. The amount of released air bubbles was measured with the lapse of time, from which an air void spacing factor was computed.

For computing an air void spacing factor, the total volume of the concrete minus the volume of the aggregate of 5 mm or larger (i.e., volume percentage of mortar) and the paste volume (volume percentage of paste) were necessary as well as the air content of the fresh concrete. The volume percentages of mortar and paste were computed from the following equations (I) and (II).

$$\text{Volume percentage of mortar (\%)} = \{(V_B + V_W + V_S)/1000\} \times 100 \quad (I)$$

$$\text{Volume percentage of paste (\%)} = \{(V_B + V_W)/1000\} \times 100 \quad (II)$$

$V_B$: Volume of cement {=unit weight of cement (kg)/specific gravity of cement}

$V_W$: Volume of liquid additives including water, AE agent and water-reducing agent (assuming that it is equal to unit content of water)

$V_S$: Volume of aggregate of 5 mm or smaller (=unit weight of fine aggregate/specific gravity of fine aggregate)

7. Compressive Strength

A 28-day aged concrete was tested according to JIS A 1108. The test piece was sized 10 cm (diameter) by 20 cm.

8. Bleeding Rate

The test was performed according to JIS A 1123.

TABLE 4

| | | Example | | | | | | | | |
|---|---|---|---|---|---|---|---|---|---|---|
| | | 1 | 2 | 3 | 4 | 5 | 6 | 7 | 8 | 9 |
| Water-soluble cellulose ether | Type | CE-1 | CE-1 | CE-1 | CE-2 | CE-2 | CE-2 | CE-2 | CE-3 | CE-4 |
| | Addition amount (g/m³) | 300 | 300 | 300 | 500 | 500 | 500 | 500 | 300 | 200 |
| AE agent | Type | AE-1 | AE-2 | AE-3 | AE-4 | AE-5 | AE-6 | AE-7 | AE-8 | AE-9 |
| | Addition amount (C × %) | 0.015 | 0.015 | 0.015 | 0.013 | 0.013 | 0.013 | 0.013 | 0.010 | 0.012 |
| Defoamer | Type | 1 | 1 | 1 | 1 | 1 | 1 | 1 | 1 | 1 |
| | Addition amount (g/m³) | 15 | 15 | 15 | 25 | 25 | 25 | 25 | 15 | 10 |
| Water-reducing agent | Type | 1 | 1 | 1 | 1 | 1 | 1 | 1 | 2 | 2 |
| | Addition amount (C × %) | 0.25 | 0.25 | 0.25 | 0.25 | 0.25 | 0.25 | 0.25 | 2.00 | 2.00 |

TABLE 4-continued

| | Example | | | | | | | | |
|---|---|---|---|---|---|---|---|---|---|
| | 1 | 2 | 3 | 4 | 5 | 6 | 7 | 8 | 9 |
| Mix | 1 | 1 | 1 | 1 | 1 | 1 | 1 | 2 | 2 |
| Test results | | | | | | | | | |
| Concrete temperature (° C.) | 20.0 | 20.3 | 19.9 | 19.8 | 20.4 | 19.6 | 19.9 | 20.5 | 19.8 |
| Air content [$A_0$] (%) | 4.6 | 4.5 | 4.8 | 4.4 | 4.3 | 4.8 | 4.1 | 4.5 | 4.4 |
| Slump (cm) | 17.0 | 18.5 | 17.5 | 19.0 | 17.5 | 18.0 | 17.0 | — | — |
| Slump flow (cm) | — | — | — | — | — | — | — | 63.0 | 62.0 |
| Relative dynamic modulus of elasticity (%) | 90 | 89 | 84 | 86 | 88 | 91 | 89 | 84 | 79 |
| Air void spacing factor (μm) | 171 | 170 | 203 | 210 | 220 | 169 | 168 | 202 | 220 |
| Compressive strength (N/mm$^2$) | 36.5 | 38.0 | 37.0 | 37.7 | 37.4 | 37.1 | 38.2 | 43.5 | 43.0 |
| Bleeding rate (%) | 0.8 | 0.9 | 1.1 | 1.0 | 1.2 | 1.1 | 1.1 | 0.6 | 0.5 |

TABLE 5

| | | Comparative Example | | |
|---|---|---|---|---|
| | | 1 | 2 | 3 |
| Water-soluble cellulose ether | Type | CE-1 | CE-1 | nil |
| | Addition amount (g/m$^3$) | 300 | 300 | 0 |
| AE agent | Type | AE-10 | AE-11 | AE-1 |
| | Addition amount (C × %) | 0.008 | 0.011 | 0.010 |
| Defoamer | Type | 1 | 1 | 1 |
| | Addition amount (g/m$^3$) | 15 | 15 | 0 |
| Water-reducing agent | Type | 1 | 1 | 2 |
| | Addition amount (C × %) | 0.25 | 0.25 | 2.00 |
| | Mix | 1 | 1 | 2 |

TABLE 5-continued

| | Comparative Example | | |
|---|---|---|---|
| | 1 | 2 | 3 |
| Test results | | | |
| Concrete temperature (° C.) | 20.0 | 19.7 | 20.1 |
| Air content [$A_0$] (%) | 4.6 | 4.7 | 4.3 |
| Slump (cm) | 17.0 | 16.5 | — |
| Slump flow (cm) | — | — | 61.5 |
| Relative dynamic modulus of elasticity (%) | 22 | 11 | 90 |
| Air void spacing factor (μm) | 360 | 376 | 170 |
| Compressive strength (N/mm$^2$) | 37.8 | 36.8 | 39.8 |
| Bleeding rate (%) | 1.1 | 1.2 | 5.2 |

TABLE 6

| | | Example | | | | | | Comparative Example | |
|---|---|---|---|---|---|---|---|---|---|
| | | 10 | 11 | 12 | 13 | 14 | 15 | 4 | 5 |
| Water-soluble cellulose ether | Type | CE-1 | CE-2 | CE-3 | CE-4 | CE-5 | CE-6 | CE-1 | CE-1 |
| | Addition amount (g/m$^3$) | 300 | 500 | 300 | 200 | 300 | 300 | 300 | 300 |
| AE agent | Type | AE-1 | AE-1 | AE-1 | AE-1 | AE-1 | AE-1 | AE-10 | AE-11 |
| | Addition amount (C × %) | 0.015 | 0.013 | 0.010 | 0.012 | 0.015 | 0.015 | 0.008 | 0.011 |
| Defoamer | Type | 2 | 2 | 2 | 2 | 2 | 2 | 2 | 2 |
| | Addition amount (g/m$^3$) | 10 | 15 | 10 | 10 | 10 | 7 | 10 | 10 |
| Water-reducing agent | Type | 1 | 1 | 1 | 1 | 1 | 1 | 1 | 1 |
| | Addition amount (C × %) | 0.25 | 0.25 | 0.25 | 0.25 | 0.25 | 0.25 | 0.25 | 0.25 |
| | Mix | 1 | 1 | 1 | 1 | 1 | 1 | 1 | 1 |
| Test results | | | | | | | | | |
| Concrete temperature (° C.) | | 20.5 | 19.5 | 19.8 | 20.1 | 20.3 | 20.9 | 19.8 | 20.1 |
| Air content [$A_0$] (%) | | 4.4 | 4.8 | 4.2 | 5.0 | 4.9 | 4.5 | 4.5 | 4.7 |
| Air content [$A_{30}$] (%) | | 4.2 | 4.6 | 3.9 | 4.7 | 4.7 | 4.2 | 3.9 | 4.0 |
| Air content retention [$A_{30}/A_0$] | | 0.95 | 0.96 | 0.93 | 0.94 | 0.96 | 0.93 | 0.87 | 0.85 |
| Slump (cm) | | 17.5 | 18.5 | 18.0 | 17.0 | 16.5 | 18.0 | 17.5 | 18.0 |
| Relative dynamic modulus of elasticity (%) | | 85 | 87 | 83 | 85 | 87 | 84 | 25 | 22 |
| Air void spacing factor (μm) | | 180 | 175 | 201 | 184 | 177 | 183 | 352 | 340 |
| Compressive strength (N/mm$^2$) | | 37.0 | 36.5 | 37.5 | 36.2 | 36.5 | 37.4 | 37.5 | 36.8 |
| Bleeding rate (%) | | 0.8 | 1.0 | 0.6 | 0.8 | 0.8 | 0.7 | 1.0 | 1.1 |

As seen from Tables 4 and 6, the concrete compositions comprising the inventive AE agents had a small air void spacing factor even though the defoamer was copresent. Each concrete composition had a relative dynamic modulus of elasticity of at least 60% and a bleeding rate of up to 1.5%, indicating frost damage resistance and good bleeding reduction effect.

As seen from Table 6, the concrete compositions comprising a water-soluble cellulose ether having a ratio (A/B) of methoxy-substituted hydroxyalkyl molar fraction (A) to methoxy-free hydroxyalkyl molar fraction (B) in the specific range were satisfactory in retaining a proper air content.

As seen from Table 5, the concrete compositions of Comparative Examples 1, 2, 4 and 5 comprising the AE agents outside the range of the invention showed a large air void spacing factor and significantly poor frost damage resistance.

The concrete composition of Comparative Example 3 showed a very high bleeding rate of 5.2% because of the absence of water-soluble cellulose ether.

Japanese Patent Application Nos. 2017-008488 and 2017-181052 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A hydraulic composition comprising at least an AE agent, a water-soluble cellulose ether, a defoamer, cement, water, and an aggregate, the AE agent comprising a fatty acid-based surfactant consisting of a fatty acid, an alkali metal salt, lower alkylamine salt or lower alkanolamine salt thereof and a nonionic surfactant consisting of a polyoxyethylene phenyl ether, said fatty acid having the general formula (1):

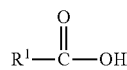

wherein $R^1$ is a $C_{12}$-$C_{24}$ alkyl or alkenyl group,
said polyoxyethylene phenyl ether having the general formula (2):

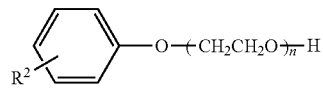

wherein $R^2$ is a $C_8$ or $C_9$ alkyl group and n is an integer of 1 to 50, and said defoamer comprising one or more selected from the group consisting of oxyalkylene, silicone, alcohol, mineral oil, fatty acid, and fatty acid ester-based defoamers, with the proviso that said oxyalkylene defoamer does not include (poly)oxyalkylene (alkyl) aryl ethers.

2. The hydraulic composition of claim 1 wherein the water-soluble cellulose ether is hydroxypropyl methyl cellulose or hydroxyethyl methyl cellulose.

3. The hydraulic composition of claim 2 wherein the hydroxypropyl methyl cellulose has a ratio (A/B) of a molar fraction of methoxy-substituted hydroxypropyl (A) to a molar fraction of methoxy-free hydroxypropyl (B) in the range from 0.2/1 to 1.0/1.

4. The hydraulic composition of claim 2 wherein the hydroxyethyl methyl cellulose has a ratio (A/B) of a molar fraction of methoxy-substituted hydroxyethyl (A) to a molar fraction of methoxy-free hydroxyethyl (B) in the range from 2.0/1 to 3.0/1.

5. The hydraulic composition of claim 1 wherein the AE agent is present in an amount of 0.0001 to 0.5% by weight based on the cement.

6. The hydraulic composition of claim 1 which has an air void spacing factor of 25 to 250 μm.

* * * * *